United States Patent [19]

Haas, Sr. et al.

[11] 4,373,429
[45] Feb. 15, 1983

[54] STEAM SEALING STRIP FOR WATER BAKING PLATES

[76] Inventors: Franz Haas, Sr., Gerstlgasse 25, 1210 Wien; Franz Haas, Jr., Castellezgasse 32, 1020 Wien; Johann Haas, Wiener Strasse 209-215, 2104 Spillern (NÖ), all of Austria

[21] Appl. No.: 238,679

[22] Filed: Feb. 27, 1981

[30] Foreign Application Priority Data

Feb. 27, 1980 [AT] Austria ................................ 1086/80

[51] Int. Cl.³ ............................................ A47J 37/01
[52] U.S. Cl. ........................................ 99/375; 99/426
[58] Field of Search .................. 99/372, 375, 444, 426

[56] References Cited

U.S. PATENT DOCUMENTS

| 1,553,989 | 9/1925 | Cook | 99/375 |
| 1,663,378 | 3/1928 | Lebert | 99/375 |
| 1,875,482 | 9/1932 | Nanna | 99/372 |

FOREIGN PATENT DOCUMENTS 480095 7/1929 Fed. Rep. of Germany .
266629 5/1950 Switzerland .

*Primary Examiner*—Billy J. Wilhite
*Attorney, Agent, or Firm*—Schwartz, Jeffery, Schwaab, Mack, Blumenthal & Koch

[57] ABSTRACT

A steam sealing strip for closing open edges between opposed upper and lower cooperating wafer baking plates includes an upper sealing strip portion for coupling with the upper baking plate and a lower sealing strip portion for coupling with the lower baking plate. The baking plates define therebetween a primary wafer baking space for the baking of dough. The upper and lower sealing strip portions provide secondary baking surfaces disposed in opposed, spaced, face-to-face relationship. These secondary baking surfaces define a secondary baking space for baking excess dough which flows from between the baking plates during the baking of wafers. By baking this excess dough, the formation of unbaked dough portions or unbaked dough balls is prevented. The sealing strip includes a plurality of steam channels for releasing steam from between the baking plates. These steam channels open into the secondary baking space.

18 Claims, 6 Drawing Figures

STEAM SEALING STRIP FOR WATER BAKING PLATES

BACKGROUND OF THE INVENTION

1. Field of the Invention

The present invention concerns steam sealing strips for wafer baking plates to laterally seal the wafer baking space formed between two wafer baking plates which are arranged above each other. Steam channels are provided in the steam sealing strips, leading to the outside from the wafer baking space.

2. Description of the Prior Art

In the production of wafers, the dough is poured in strips, with the baking tongs open, onto the lower wafer baking plate; and the baking tongs are subsequently closed. During the closing of the baking tongs, the dough, which as a considerable water content, contacts the hot surfaces of the two wafer baking plates. The water contained in the dough begins to evaporate and distributes the dough over the entire baking space. In order to obtain a sheet of wafers that is homogeneous and has the same mechanical strength even to the corners, it is necessary to pour on slightly more dough than required. This excess dough exits through the steam channels of the steam sealing strips and forms balls of dough at the ends of the channels. While the excess dough remaining in the steam channels is baked and forms so-called dough webs from which the small dough balls are suspended, the balls themselves are not baked but remain mostly in the form of a very sticky mass. The failure of the dough balls to be baked may be attributed primarily, in addition to the absence of baking surfaces in contact with them, to the frequently too low baking temperatures in the baking space of the oven. This is particularly true for electrically heated ovens wherein the heating devices are arranged in the baking plates themselves and the oven space is heated merely by the heat radiated by the baking plates. Furthermore, the steam generated in the baking process must be removed from the oven space, causing the movement of large volumes of air through the oven space. Thus, in the oven space, especially in electrically heated ovens, the temperature necessary to effect baking of the balls of dough is never attained.

The resulting problems stem primarily from the fact that the adhesive balls of dough remain suspended from the rims of the baking plates and do not drop away. This leads, in the course of the process, to an accumulation of balls of dough, which interferes with the degassing process during the baking of the sheets of wafers. Furthermore, the unbaked balls of dough remain suspended on all of the parts inside of the oven space and are, therefore, difficult to remove.

In electrically heated baking ovens, the balls of dough resulting from the individual production runs form a single lump, which dries out during a shutdown of the oven or over an extended period of operation. The lump becomes hard enough so that it can be removed by mechanical means only. This leads to highly expensive cleaning procedures of automatic baking machines and thus to increased labor costs. Even when the unbaked balls of dough separate from the wafer plate and drop into the inside of the automatic machine, they interfere with operation. This is so because, in electrically heated ovens, sliding contacts and bus bars are arranged underneath the baking plates, and the balls of dough dropping onto them glue the contacts and bars together, which leads to an interruption of the current.

Another reason why it is desirable to obtain baked balls of dough is that the unbaked balls of dough spoil rapidly and cannot be utilized further.

SUMMARY OF THE INVENTION

It is the object of the invention to eliminate the problem of unbaked portions or balls of dough on baking plates. This object is attained according to the invention, based on a steam sealing strip of the abovedescribed type, by means of two strip portions, each fastened to one of the two baking plates. The strip portions form, with their surfaces which face each other, a gap similar to a baking space into which the steam channels open. In this gap, the waste material generated during the degassing of the wafer sheets can be baked essentially without pressure. The baking space-like gap is offset—in keeping with a further characteristic of the invention—downward from the baking surface of the bottom baking plate. Preferably, the gap is arranged at an incline with respect to the baking surface of the wafer baking plates. These characteristics ensure not only that the balls of dough will be baked, but also that, upon the opening of the baking tongs and the removal of the sheet of wafers, the balls of dough and the like immediately separate from the wafer plate and are easily slid out from the gap of the steam sealing strips.

The abovementioned inclination according to the invention may amount to between 0° and 85°. An inclination of the gap of 15° to 60° is particularly advantageous.

According to another characteristic of the invention, the strip portions are designed at their sides facing away from the wafer baking plates as additional sealing strips for closing of the gap. In this manner, conditions similar to those prevailing in the baking space are created, i.e., the balls of dough are pressed against the hot additional steam sealing strip portions as in the baking space between the wafer baking plates, whereby the baking effect is improved.

This effect may also be achieved according to the invention by decreasing the height of the gap in the direction away from the wafer baking plates.

As the size of the balls of dough depends very substantially on the consistency of the dough poured in, it is desirable to adapt the baking space-like gap between the steam sealing strip portions to the prevailing constitution of the dough. For this purpose, according to another characteristic of the invention, the upper and/or the lower strip portion of each baking plate is mounted in a height adjustable manner.

Furthermore, in order to obtain conditions in the gap similar to the baking space, it is provided according to the invention that the height of the gap is 0.5 to 2.5 times, preferably 0.8 to 1.5 times, the height of the wafer baking space, with the depth of engraving neglected, while the width of the gap is 5 to 30 times, preferably 10 to 20 times, the height of the wafer baking space.

According to a preferred form of embodiment of the invention, the lower strip portion is made as a single piece with the lower wafer baking plate. Thus, a very simple production process and further processing of the steam sealing strips is achieved. This is because the working of the surface of said strips may be effected simultaneously with that of the wafer baking plate.

To restate certain of the foregoing in different terms, the present invention involves a steam sealing strip for closing open edges between opposed upper and lower cooperating wafer baking plates having opposed primary wafer baking surfaces spaced apart by a certain height. The primary wafer baking surfaces define a primary wafer baking space between the wafer baking plates. The primary wafer baking space is, of course, for the baking of dough. The height between the plates is also the height of the primary wafer baking space. This height does not include the depth of any engraving in the primary baking surfaces. The sealing strip includes an upper sealing strip portion for coupling with the upper baking plate and a lower sealing strip portion for coupling with the lower baking plate. The upper sealing strip portion has a secondary baking surface facing the lower sealing strip portion. The lower sealing strip portion, similarly, has a secondary baking surface facing the upper sealing strip portion. These secondary baking surfaces of the upper and lower sealing strip portions are in opposed, spaced, face-to-face relationship and define a gap therebetween. There is a secondary baking space between the opposed surfaces of the sealing strips for receiving excess dough from between the baking plates and for baking the excess dough to prevent the formation of unbaked dough portions. This secondary baking space is defined by the gap between the secondary baking surfaces of the sealing strip portions. In other words, the sealing strip of the present invention includes means for baking excess dough which flows from between the baking plates to prevent the formation of unbaked dough portions. As indicated, this excess dough baking means includes a secondary baking space between the opposed surfaces of the sealing strips. As also indicated, this secondary baking space is defined by the spaced secondary baking surfaces of the sealing strip portions. There are a plurality of steam channels in at least one of the sealing strip portions for releasing steam from between the baking plates. These steam channels open into the secondary baking space.

As will be apparent from the foregoing, the secondary baking space is of such volume and configuration as to contain and effect baking of substantially all excess dough which flows from between the wafer baking plates during the baking of wafers.

Each sealing strip portion is elongated and includes a horizontal axis running perpendicular to its length. According to certain embodiments of the invention, the gap between the secondary baking surfaces may be disposed for inclination with respect to such horizontal axis and with respect to the primary wafer baking surfaces of the wafer baking plates. In another embodiment, the gap may be disposed in a downwardly offset disposition with respect to the primary baking surface of the lower wafer baking plate.

The sealing strip includes a side adjacent the wafer baking plates and a side remote therefrom, the remote side facing away from the wafer baking plates. This remotes side, as previously indicated, may include an additional sealing strip for closing off the gap between the secondary baking surfaces.

The gap between the secondary baking surfaces of the upper and lower sealing strip portions includes a height dimension which runs perpendicular to the length of the sealing strip portions and perpendicular to the secondary baking surfaces. The gap also includes a width dimension which runs perpendicular to the height dimension and parallel to the secondary baking surfaces.

As indicated, at least one of the sealing strip portions includes an adjustable mounting means for adjustably mounting such sealing strip portions on one of the wafer baking plates so the height of the gap and thus capacity of the secondary baking space may be adjusted.

The invention shall be explained hereinbelow in more detail with the aid of the drawings in a number of exemplary embodiments.

DETAILED DESCRIPTION

Figure 1:
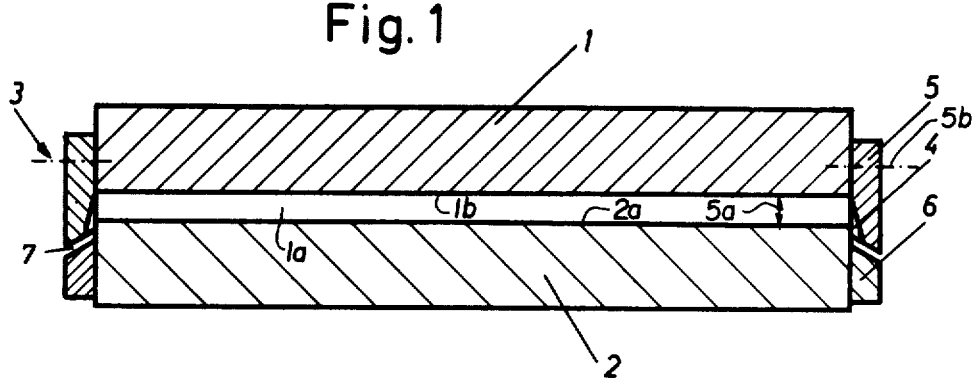
FIG. 1 shows two wafer baking plates arranged above each other, in vertical cross section, and shows one form of embodiment of the steam sealing strip according to the invention.

In the production of sheets of wafers, each wafer sheet is baked in the wafer baking space 1a of closed baking tongs. Referring to FIG. 1, the baking space 1a is defined by an upper baking plate 1 having a wafer baking surface 1b and a lower baking plate 2 having a wafer baking surface 2a. Baking space 1a is closed laterally by means of steam sealing strips 3. In the steam sealing strips 3, steam channels 4 are provided, leading in the outward direction from the wafer baking space. The steam sealing strips 3 consist of an upper strip portion 5 secured to the upper wafer baking plate, and a lower strip portion 6 fastened to the lower wafer baking plate. With the baking tongs closed, a secondary baking space defined by baking space-like gap 7 is formed between the two strip portions 5 and 6. Baking space-like gap 7 is connected with the baking space between the wafer baking plates 1, 2 (the latter may be referred to as the "primary" wafer baking space) by means of steam channels 4.

Figure 2:
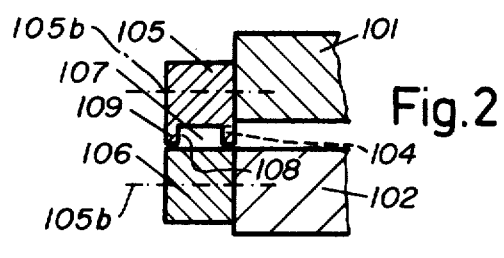
FIGS. 2-6 show, respectively, in fragmentary vertical cross sections, other forms of embodiment of the steam sealing strip according to the invention.

In the embodiments which follow, the last digit of each reference character refers to a feature or element analogous to that designated by a corresponding number to FIG. 1. For example, reference numeral 101 of FIG. 2 designates the upper baking plate, which is analogous to upper baking plate 1 of FIG. 1 and reference number 201 of FIG. 3 then designates the upper baking plate which is also analogous to upper baking plate 1 of FIG. 1. The reference numerals of FIG. 2 are in a 100 series, those of FIG. 3 in a 200 series, those of FIG. 4A in a 400 series, those of FIG. 4B in a 500 series, those of FIG. 5 in a 600 series, and those of FIG. 6 in a 700 series. It will be appreciated that not all reference characters are referred to herein, where the subject was described in connection with a preceding embodiment. For example, the description of the upper baking plate 1 is believed sufficient for baking plates 101, 201, 301, 401, 501, 601 and 701 without specifically referring to each and every one of the latter elements.

According to FIG. 2, the baking space-like gap 107 may be provided in the form of a longitudinal groove 108 in the upper strip 105, the groove being defined by longitudinal ribs 109. The groove 108 rests with its edges, in the closed state of the baking tongs, on the lower strip portion 106, wherein the longitudinal groove is connected with the baking space only by means of the steam channels 104 in the shape of slits in the lateral wall of the groove facing the baking space (FIG. 2).

Figure 3:
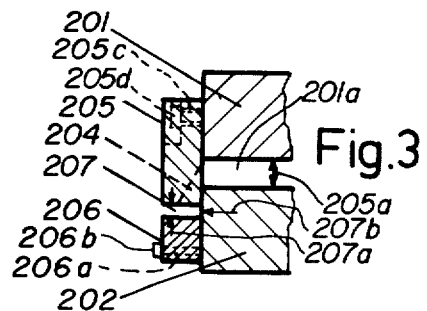

According to another embodiment of the invention as shown in FIG. 3, the baking space-like gap 207 is offset in the downward direction with respect to the baking surface of the lower wafer baking plate portion defining the baking space at the bottom. The gap 207 in this case is formed, with the baking tongs closed, between the two longitudinal sides of the strips 205 and 206 (which sides may be referred to as "secondary" baking surfaces) which face each other. The upper strip portion 205 is fastened laterally to the upper wafer baking plates 201 and projects slightly over its baking surface in the downward direction in excess of the height 205a (also shown as 5a in FIG. 1 and 605a in FIG. 5) of the baking space, so that with the baking tongs closed, the primary baking space 201a is sealed off laterally by the upper strip portion 205. It will be seen that height 205a is taken in a direction perpendicular to: (i) the length of the strips 3 (FIG. 1), (ii) the baking surfaces 1b and 2a (FIG. 1), and (iii) the horizontal axes 5b (5b in FIG. 1, 105b in FIG. 2) of the strip portions. Referring again to FIG. 3, the steam channels leading in the outward direction from the primary wafer baking space are provided in the upper strip portion 205. The upper strip portion 205 has slotted holes 205c for mounting screws 205d in order to allow the adjustment of the upper strip portion 205 in a direction perpendicular to the baking surfaces 201b and 202a. Due to the adjustment of the upper strip portion 205 in cooperation with the lateral edge of the lower wafer baking plate 202 the cross section of the steam channels 204 may be enlarged or reduced, thus enlarging or reducing the quantitity of dough exiting through the steam channels 204. The lower strip 206 is secured to the lower wafer baking plate, wherein the lower strip 206 has elongated holes 206a for the mounting screws 206b in order to allow the adjustment of the height of the gap (FIG. 3).

Figure 4:
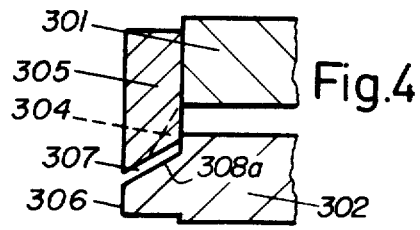

In the embodiment shown in FIG. 4, the lower strip 306 is of a single piece with the lower wafer baking plate 302. In this case, the lower strip 306 is formed by a step 308a that is disposed lower than the baking surface of the lower wafer baking plate 302, with the upper surface of said step 308a being inclined upwardly toward the baking surface.

Figure 5:
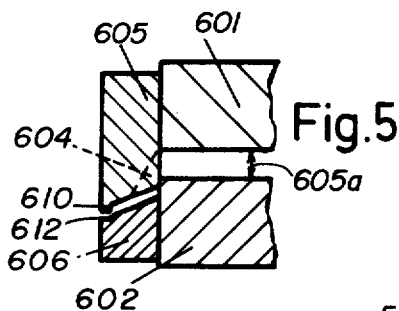
Figures 4A, 4B, 6:
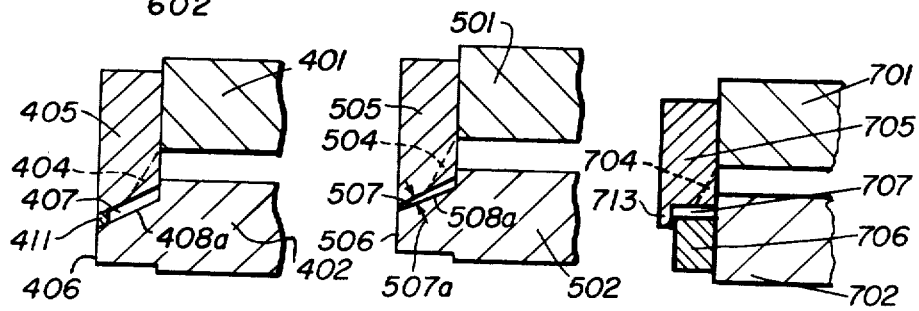

This bevelled step 308a defines the baking space-like gap in the downward direction. In the upward direction, the gap 307 is limited by the bottom side of the upper strip portion 305, which is also inclined with respect to the baking surface. On the side facing the baking space, the gap 307 is bounded by the lower wafer baking plate 302 and connected with the baking space by the steam channels 304 only. On the side facing away from the wafer baking plates, the gap is either open or sealed (as shown in FIG. 4A) by means of yet another sealing strip 4, 11. This additional sealing strip may have a configuration similar to longitudinal rib 109 of the type shown in FIG. 2, resting on the top side of the lower strip 106. Also, the height dimension 507a of the gap 507 may decrease in a direction away from the primary wafer baking plates 501, 502 as shown in FIG. 4B. Note also that the gap has a width dimension 207b (FIG. 3). Alternatively, and as shown in FIG. 5, the sealing strip may consist of a longitudinal rib 610 (FIG. 5) projecting past the inclined bottom side, said rib engaging a groove 612 on the upper side of the lower strip 606 (FIG. 5).

A further form of embodiment of the sealing strip provides a rib 713 on the end of the gap 707 facing away from the baking space, said rib extending from the upper strip 705 along the lower strip 706 and laterally closing the gap 707 (FIG. 6).

It was mentioned earlier that the width of the baking space-like gap, i.e. the gap forming the secondary baking space, is 5 to 30 times, and preferably 10 to 20 times, the height of the wafer baking space. Taking this statement in light of the drawing, it will be immediately apparent to one skilled in the art that the height of the baking space in the drawing is greatly exaggerated. This, of course, is because a baking space height on the scale described is not susceptible of illustration without using an unduly large scale for the sealing strip, and thus the drawing is not to scale in this regard.

What is claimed is:

1. A steam sealing strip for closing open edges between opposed upper and lower cooperating wafer baking plates having opposed primary wafer baking surfaces spaced apart by a certain height, the primary wafer baking surfaces defining a primary wafer baking space between the wafer baking plates, the primary wafer baking space being for the baking of dough, the height between plates also being the height of the primary wafer baking space, which height does not include the depth of any engraving in the primary baking surfaces, the sealing strip comprising:

an upper sealing strip portion for coupling with the upper baking plate;

a lower sealing strip portion for coupling with the lower baking plate;

said upper sealing strip portion having a secondary baking surface facing said lower sealing strip portion;

said lower sealing strip portion having a secondary baking surface facing said upper sealing strip portion, said secondary baking surfaces of said upper and lower sealing strip portions being in opposed, spaced, face-to-face relationship and defining a gap therebetween;

a secondary baking space between said opposed surfaces of said sealing strip portions for receiving excess dough from between the baking plates and for baking the excess dough to prevent the formation of unbaked dough portions, said secondary baking space being defined by said gap between said secondary baking surfaces of said sealing strip portions; and a plurality of steam channels in at least one of said sealing strip portions for releasing steam from between the wafer baking plates, said steam channels opening into said secondary baking space.

2. A steam sealing strip according to claim 1, wherein said secondary baking space is of such volume and configuration as to contain and effect baking of substantially all excess dough which flows from between the wafer baking plates during the baking of wafers.

3. A steam sealing strip according to claim 1, wherein said gap between said secondary baking surface is disposed for downwardly offset disposition with respect to the primary baking surface of the lower wafer baking plate.

4. A steam sealing strip according to claim 1, wherein each sealing strip portion is elongated and includes a horizontal axis running perpendicular to its length, and wherein said gap between said secondary baking surfaces is disposed for inclination with respect to said horizontal axis and with respect to the primary wafer baking surfaces of the wafer baking plates.

5. A steam sealing strip according to claim 4, wherein said inclination amounts to between 0° and 85°.

6. A steam sealing strip according to claim 4, wherein said inclination is between 15° and 60°.

7. A steam sealing strip according to claim 1 or 4, wherein said sealing strip includes a side adjacent the wafer baking plates and a side remote therefrom, said remote side facing away from the wafer baking plates, said remote side including an additional sealing strip for closing off said gap between said secondary baking surfaces.

8. A steam sealing strip according to claim 1, wherein said lower sealing strip portion is constructed to be of one piece with the lower wafer baking plate.

9. A steam sealing strip according to claim 1, wherein said sealing strip portions are elongated and wherein said gap between said secondary baking surfaces includes a height dimension which runs perpendicular to the length of said sealing strip portions and perpendicular to the secondary baking surfaces and a width dimension which runs perpendicular to said height dimension and parallel to the secondary baking surfaces.

10. A steam sealing strip according to claim 9, wherein at least one of said sealing strip portions includes an adjustable mounting means for adjustably mounting said at least one sealing strip portion on one of the wafer baking plates so that said height of said gap and thus the capacity of the secondary baking space may be adjusted.

11. A steam sealing strip according to claim 9, wherein said height dimension of said gap amounts to 0.35 to 2.5 times the height of the primary wafer baking space.

12. A steam sealing strip according to claim 9, wherein said height dimension of said gap amounts to 0.8 to 1.5 times the height of the primary wafer baking space.

13. A steam sealing strip according to claim 9, wherein said width dimension of said gap amounts to 5 to 30 times the height of the primary wafer baking space.

14. A steam sealing strip according to claim 9, wherein said width dimension of said gap amounts to 10 to 20 times the height of the primary wafer baking space.

15. A steam sealing strip according to claim 9, wherein said height dimension of said gap decreases in a direction away from the primary wafer baking plates.

16. A steam sealing strip for closing open edges between opposed upper and lower cooperating wafer baking plates having opposed primary wafer baking surfaces, the baking plates defining a primary wafer baking space therebetween for the baking of dough, the sealing strip comprising:
  an upper sealing strip portion for coupling with the upper baking plate;
  a lower sealing strip portion for coupling with the lower baking plate;
  said upper sealing strip portion having a secondary baking surface facing said lower sealing strip portion;
  said lower sealing strip portion having a secondary baking surface facing said upper sealing strip portion, said secondary baking surfaces of said upper and lower sealing strip portions being in opposed, spaced, face-to-face relationship;
  means for baking excess dough which flows from between the baking plates to prevent the formation of unbaked dough portions, said excess dough baking means including a secondary baking space between said opposed surfaces of said sealing strips; said secondary baking space being defined by said spaced secondary baking surfaces of said sealing strip portions;
  a plurality of steam channels in at least one of said sealing strip portions for releasing steam from between the baking plates, said steam channels opening into said secondary baking space.

17. A steam sealing strip according to claim 16, wherein said secondary baking space is of such volume and configuration as to contain and effect baking of substantially all excess dough which flows from between the wafer baking plates during the baking of wafers.

18. A steam sealing strip for laterally sealing a primary baking space, which primary baking space is disposed between opposed upper and lower cooperating wafer baking plates having opposed primary wafer baking surfaces, the primary wafer baking surfaces having edges, the sealing strips comprising:
  an upper sealing strip portion for running along the edges of the primary wafer baking surface of the upper baking plate;
  a lower sealing strip portion for running along the edges of the primary wafer baking surface of the lower wafer baking plate;
  at least one of said sealing strip portions having a plurality of steam channels leading in an outward direction away from the primary baking space;
  said steam channels also leading from a part of the sealing strip portions adjacent the primary baking space to a secondary baking space formed between the upper and lower sealing strips for the baking of any dough carried away by steam from the primary baking space during baking;
  said sealing strip portions having surfaces facing each other, said facing surfaces defining said secondary baking space;
  said secondary baking space being offset in a downward direction with respect to the primary baking space defined by the upper and lower primary baking surfaces so that said primary and secondary baking spaces are misaligned with each other; and
  said secondary baking space being connected to the primary baking space only by said steam channels.

* * * * *